United States Patent [19]

Terayama et al.

[11] Patent Number: 4,687,296
[45] Date of Patent: Aug. 18, 1987

[54] OPTICAL PICKUP

[75] Inventors: Yasunori Terayama, Chiba; Masashi Nakamura, Tokyo; Kazuhiko Fujiie, Tokyo; You Yoshitoshi, Tokyo, all of Japan

[73] Assignee: Sony Corporation, Tokyo, Japan

[21] Appl. No.: 768,056

[22] Filed: Aug. 22, 1985

[30] Foreign Application Priority Data

Sep. 28, 1984 [JP] Japan ............................ 59-146806[U]

[51] Int. Cl.⁴ .......................... G02B 7/04; F16C 25/06
[52] U.S. Cl. ................................... 350/247; 350/255; 384/10
[58] Field of Search .................. 350/247, 252, 255; 369/44–45; 384/8, 10, 37–38, 40, 54, 57, 446, 627

[56] References Cited

U.S. PATENT DOCUMENTS

| 3,554,617 | 1/1971 | Weaver | 384/8 |
| 4,068,906 | 1/1978 | Dür et al. | 384/54 |
| 4,480,881 | 11/1984 | Fujimori | 384/446 |
| 4,518,205 | 5/1985 | Heathe | 384/40 |
| 4,566,089 | 1/1986 | Kime | 369/44 |
| 4,571,026 | 2/1986 | Maruta | 350/255 |

FOREIGN PATENT DOCUMENTS

| 63934 | 11/1982 | European Pat. Off. . | |
| 164450 | 10/1982 | Japan | 369/45 |
| 164036 | 9/1983 | Japan | 369/45 |
| 229750 | 12/1984 | Japan | 350/255 |

Primary Examiner—William H. Punter
Attorney, Agent, or Firm—Hill, Van Santen, Steadman & Simpson

[57] ABSTRACT

An optical pickup of the invention has an objective lens holder holding an objective lens, a support shaft which supports the objective lens holder such that the holder is slidable along the axial direction and pivotable about its axis, and a press member for pressing the objective lens holder against the support shaft.

5 Claims, 11 Drawing Figures

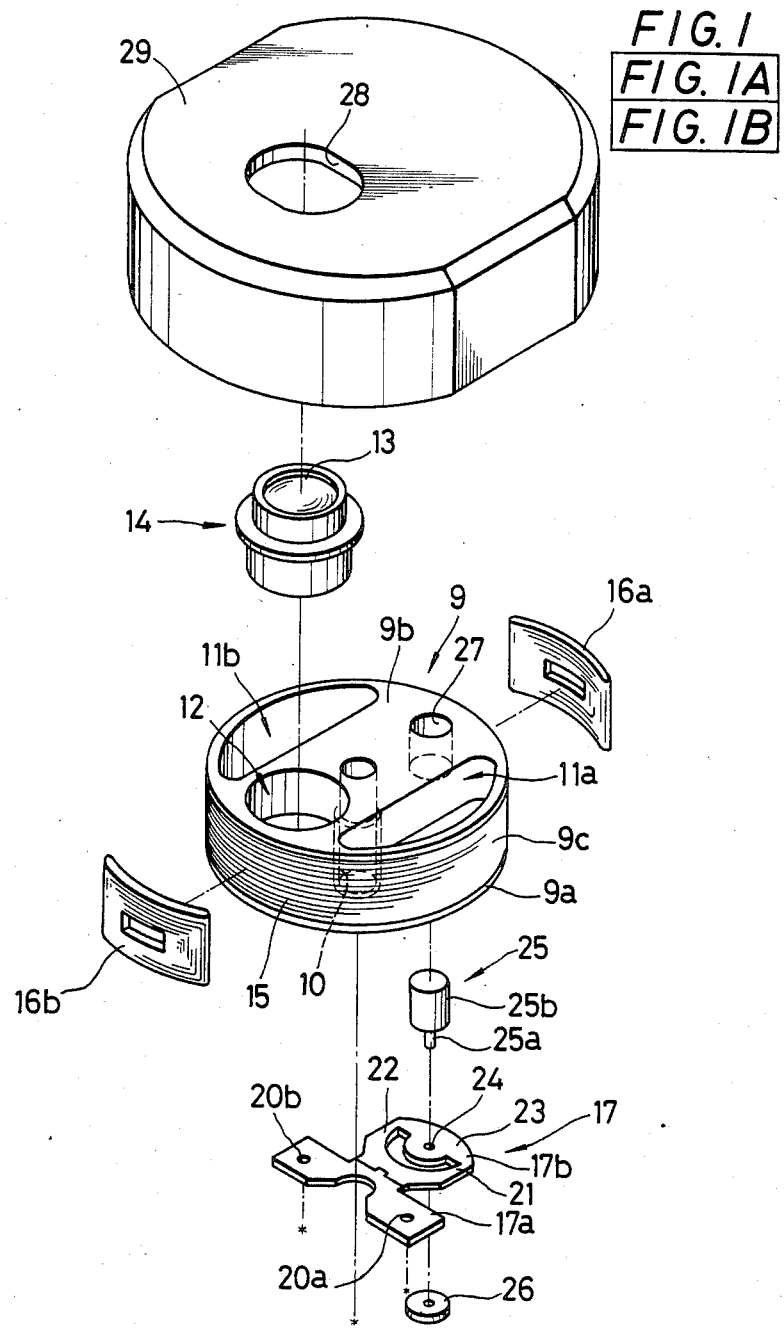
FIG. IA  PRIOR ART

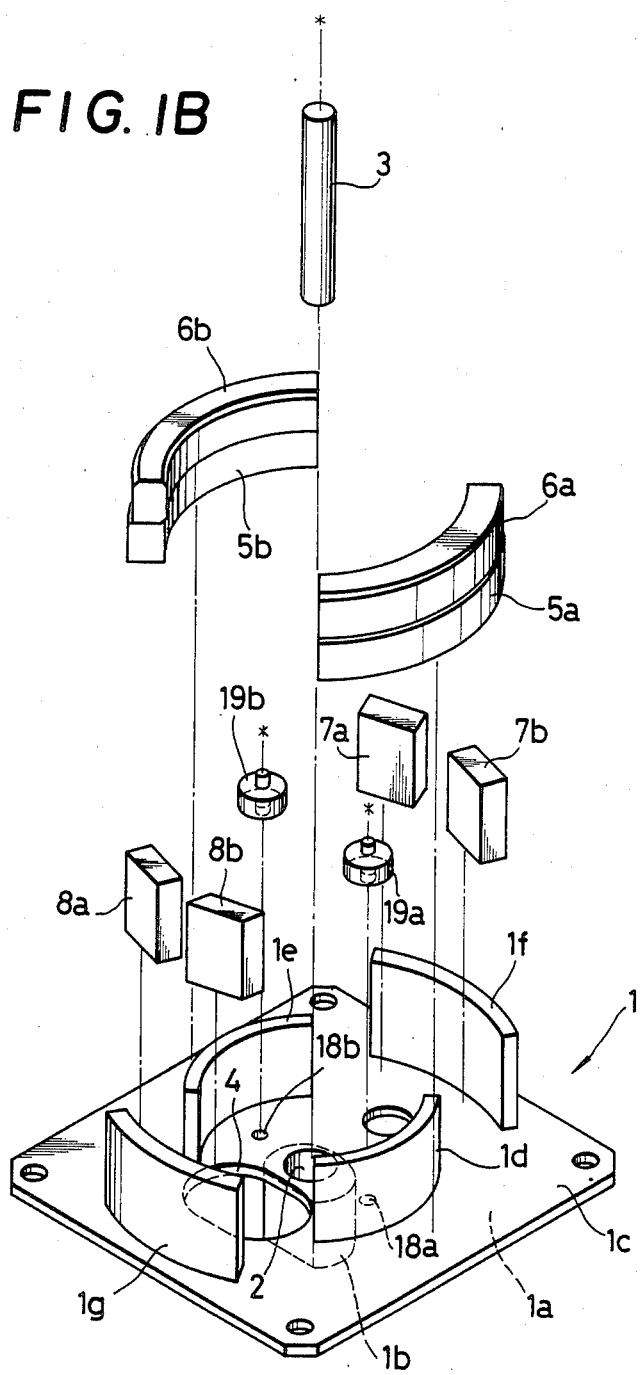
FIG. IB

OPTICAL PICKUP

BACKGROUND OF THE INVENTION

1. Field of the Invention

The present invention relates to an optical pickup in which an objective lens holder is slidably and pivotably supported by a support shaft.

2. Description of the Prior Art

FIGS. 1 to 4 show a conventional optical pickup of the type described above. In this conventional optical pickup, a tubular projection 1b extends downward from the central portion of a lower surface 1a of a base 1. A pair of first yokes 1d and 1e oppose each other near the center of an upper surface 1c of the base 1 through a support shaft 3 having its lower end inserted into an inner hole 2 of the projection 1b. A pair of second yokes 1f and 1g similarly oppose each other near the periphery of the upper surface 1c of the base 1 through the support shaft 3.

The base 1, the projection 1b, the first yokes 1d and 1e and the second yokes 1f and 1g are integrally formed of a magnetic material. An elongated optical window 4 is formed in the base 1 so as to allow a laser beam to pass therethrough.

A pair of first magnets 5a and 5b are mounted on the upper surface 1c of the base 1 so that they extend along the outer circumferential surfaces of the first yokes 1d and 1e at predetermined distances therefrom. A pair of third yokes 6a and 6b are mounted on the upper surfaces of the first magnets 5a and 5b, respectively. Pairs of rectangular, second magnets 7a and 7b, and 8a and 8b are fixed to the inner circumferential surfaces of the second yokes 1f and 1g, respectively.

An objective lens holder 9 consists of a flat cylindrical portion 9a and an end disk 9b mounted at the upper portion of the cylindrical portion 9a. The holder 9 consists of a non-magnetic material.

A bearing hole 10 is formed at the central axis position of the holder 9 and receives the upper portion of the support shaft 3. The objective lens holder 9 is supported to be pivotable about the axis of the support shaft 3 and to be slidable along the axial direction of the support shaft 3.

A pair of insertion holes 11a and 11b are formed in the end disk 9b of the holder 9 so as to be located at the two sides of the bearing hole 10. The distal ends of the first yokes 1d and 1e are inserted in the insertion holes 11a and 11b, respectively. A lens hole 12 is formed at a location between the insertion holes 11a and 11b and separated from the bearing hole 10. A lens barrel 14 holding an objective lens 13 therein is inserted in the lens hole 12.

A focusing coil 15 is wound circumferentially around a circumferential side wall 9c of the holder 9. Two tracking coils 16a and 16b are adhered to the surface of the focusing coil 15 so as to oppose each other through the support shaft 3 and to oppose the inner surfaces of the second magnets 7a and 7b, and 8a and 8b, respectively.

Thus, a first magnetic circuit is constituted by the first yokes 1d and 1e, the third yokes 6a and 6b, and the first magnets 5a and 5b. A second magnetic circuit is constituted by the second yokes 1f and 1g and the second magnets 7a, 7b, 8a and 8b.

When a current is supplied to the focusing coil 15, the objective lens holder 9 is slid along the axial direction of the support shaft 3 so as to perform focusing. When a current is supplied to the tracking coils 16a and 16b, the holder 9 is pivoted about the axis of the support shaft 3 so as to perform tracking.

When the tracking power for pivoting the holder 9 about the axis of the support shaft 3 is released, in order to automatically return the holder 9 to its neutral position, an elastic support member 17 as a neutral position holding mechanism is inserted between the base 1 and the objective lens holder 9.

The elastic support member 17 is obtained by welding an elastic support plate 17b consisting of silicone rubber or the like to one end of a rubber mounting metal member 17a, e.g., a metal plate.

A pair of holes 18a and 18b are formed in the base 1 so as to oppose each other through the support shaft 3 interposed therebetween and respectively receive one end of each of a pair of mounts 19a and 19b. The other end of each of the mounts 19a and 19b is received in a corresponding one of a pair of small holes 20a and 20b formed in the rubber mount metal member 17a. In this manner, the elastic support member 17 is mounted on the base 1 through the pair of mounts 19a and 19b.

The elastic support plate 17b comprises an integral assembly of first and second arms 21 and 22 which extend in two directions away from the support shaft 3 within a plane substantially perpendicular to the axis of the support shaft 3 from the side of the rubber mount metal member 17a, and a connecting portion 23 connecting the first and second arms 21 and 22. A small hole 24 formed in the central portion of the connecting portion 23 receives a small-diameter portion 25a at one end of a balancer pin 25 made of a plastic material or the like. A collar 26 is inserted into the end portion of the small-diameter portion 25a so as to couple the elastic support member 17 and the balancer pin 25.

A large-diameter portion 26b at the other end of the balancer pin 25 is fitted in a through hole 27 formed in a portion of the holder 9 which is separated from the axis of the support shaft 3, thereby coupling the objective lens holder 9 with the elastic support member 17 through the balancer pin 25.

The objective lens holder 9 and the like are housed in a housing cover 29 having an elongated opening 28 at a position corresponding to the objective lens 13.

However, in the conventional optical pickup as described above, a clearance of about 20 $\mu$m is present between the support shaft 3 and the bearing hole 10 formed in the objective lens holder 9. For this reason, when the optical pickup is vibrated, the objective lens holder 9 is shaked and the objective lens 13 is abruptly displaced.

When tracking servo cannot compensate for such a displacement, a track jump is made and normal recording/reproducing cannot be performed. This means an optical pickup of the type as described above has a poor vibration resistance.

OBJECT AND SUMMARY OF THE INVENTION

It is an object of the present invention to provide an optical pickup having a good vibration resistance.

In an optical pickup of the present invention, since an objective lens holder is pressed against a support shaft by a press member, shaking of the objective lens holder is reduced to a minimum even if there is a clearance between the objective lens holder and the support shaft.

BRIEF DESCRIPTION OF THE DRAWINGS

FIGS. 1A and 1B to 4 show a conventional optical pickup, in which

FIG. 1 is an exploded perspective view,

FIG. 2 is a plan view,

FIG. 3 is a side sectional view along the line III—III in FIG. 2, and

FIG. 4 is a side sectional view along the line IV—IV in FIG. 2;

DETAILED DESCRIPTION OF THE PREFERRED EMBODIMENT

An embodiment of the present invention will be described with reference to FIGS. 5 to 8.

Figure 2:
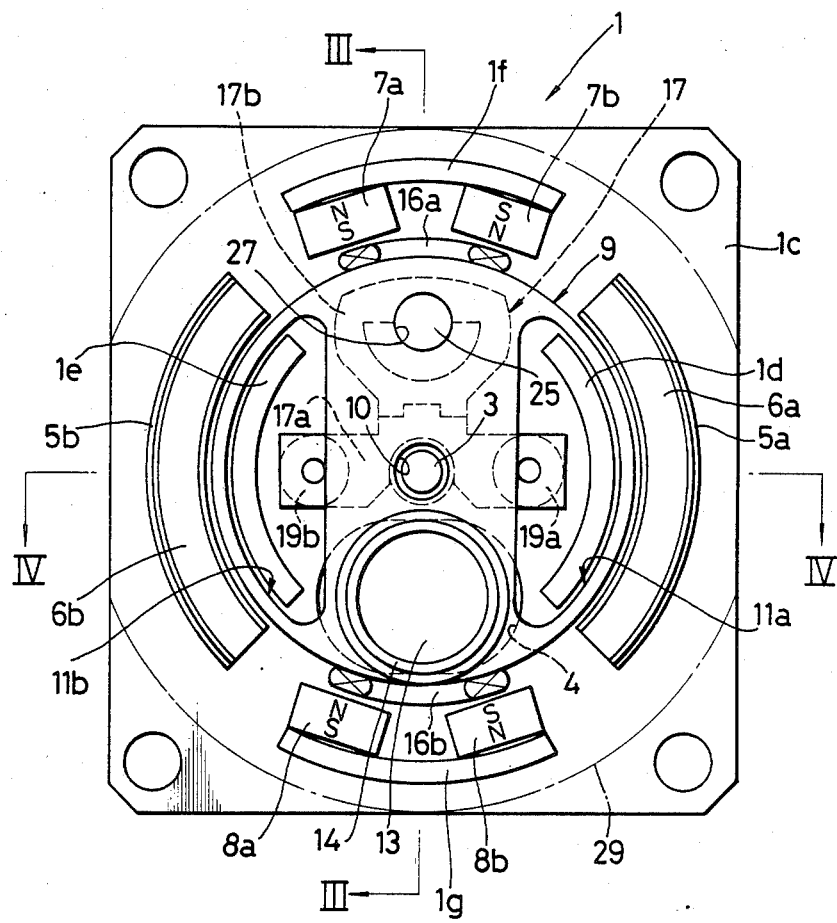
Figure 3:
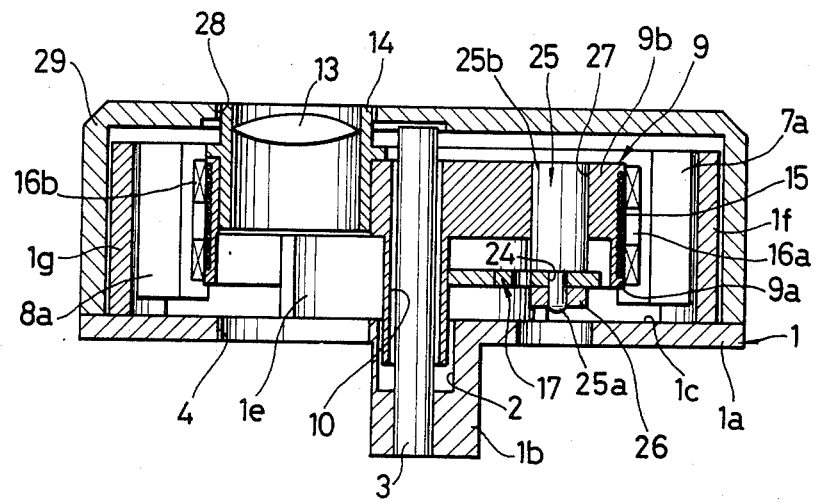
Figure 4:
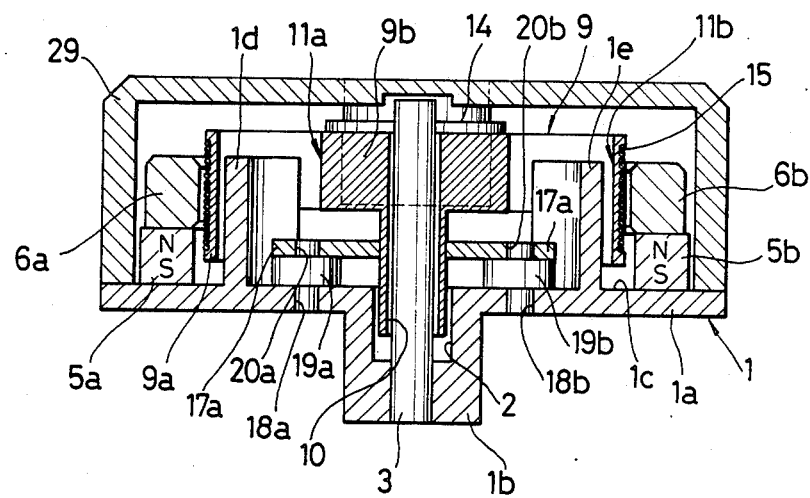
Figure 5:
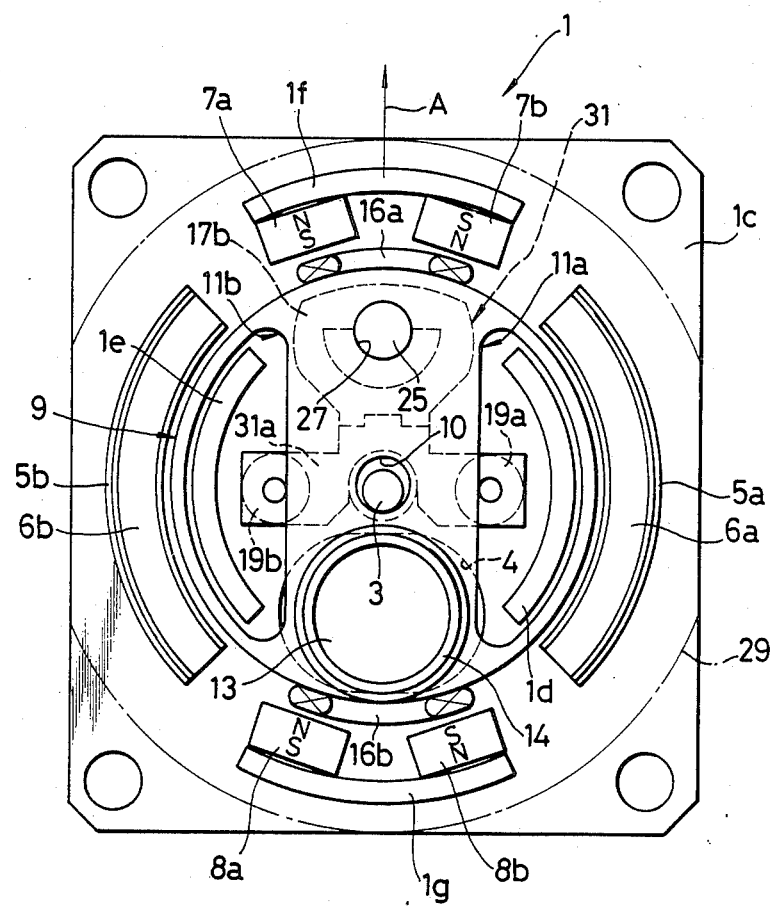
FIG. 5 is a plan view showing an embodiment of the present invention.
Figure 6:
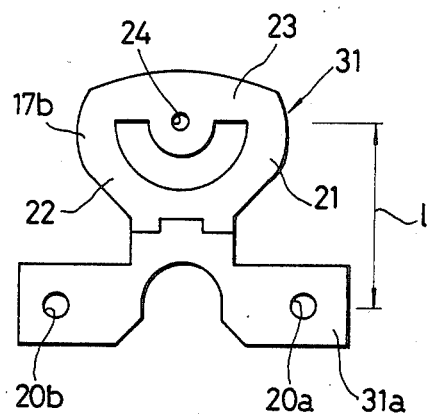
FIG. 6 is a plan view showing a press member used in the embodiment shown in FIG. 5.

FIG. 5 shows the embodiment. In this embodiment, as shown in FIG. 6, small holes 20a and 20b of a rubber mount metal member 31a of an elastic support member 31 are at positions further separated from the elastic support plate 17b than in the rubber mount metal member 17a. For this reason, a distance 1 between the small holes 20a and 20b and a small hole 24 is larger than that in the elastic support member 17 by 0.4 to 0.6 μm. The optical pickup according to this embodiment of the present invention is basically the same as the conventional optical pickup except in the above respect.

The elastic support member 31 is mounted on a base 1 through mounts 19a and 19b such that the holes 20a and 20b correspond to holes 18a and 18b opposing each other through a support shaft 3 interposed therebetween. For this reason, a balancer pin 25 having a small-diameter portion 25a inserted in the small hole 24 is further separated from the support shaft 3 than in the conventional optical pickup.

As a result, an objective lens holder 9 fitted with a large-diameter portion 25b of the balancer pin 25 is shifted along the direction indicated by arrow A relative to the support shaft 3 more than in the conventional optical pickup. Therefore, in this embodiment, as shown in FIG. 5, the inner circumferential surface of a bearing hole 10 is elastically pressed toward the outer circumferential surface of the support shaft 3 along the direction indicated by arrow A, i.e., in a direction perpendicular to the tracking direction. Shaking of the objective lens holder 9 is thus reduced to a minimum.

Figure 7:
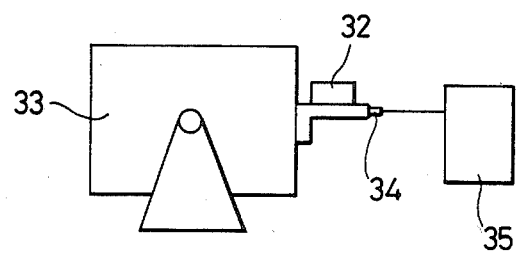
FIG. 7 is a side view showing a method of a vibration test.

FIG. 7 shows a method of a vibration test of the optical pickup. In this vibration test, an optical disk player 32 mounting the optical pickup was vibrated by monotonous sinusoidal wave by a vibrator 33 within a horizontal plane and in a direction 30° rotated from the tracking direction. Acceleration of the player 32 was measured by an acceleration pickup 34 and was read by a charge amplifier 35.

Figure 8:
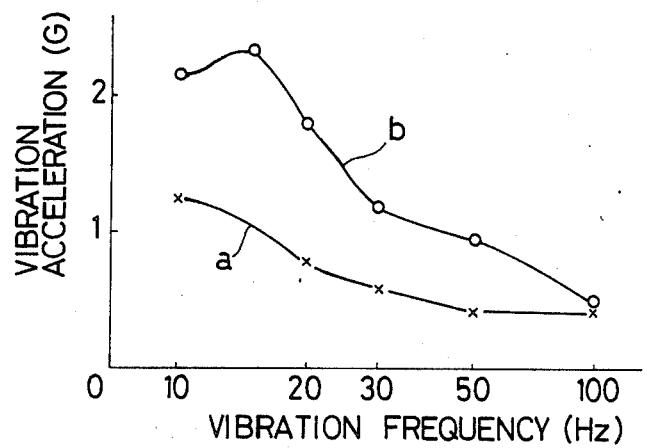
FIG. 8 is a graph showing the results obtained by the vibration test.

FIG. 8 shows the results obtained by the vibration test; it shows the vibration acceleration as a function of frequency when a sound drop-out is caused. As can be seen from data a of the conventional optical pickup and data b of the optical pickup according to the embodiment of the present invention, the optical pickup according to the embodiment of the present invention has a good vibration resistance.

In the above embodiment, the length 1 of the elastic support member 31 is increased so as to elastically press the inner circumferential surface of the bearing hole 10 against the outer circumferential surface of the support shaft 3 along the direction indicated by arrow A. However, the inner circumferential surface of the bearing hole 10 can be elastically pressed against the outer circumferential surface of the support shaft 3 along the direction indicated by arrow A, by forming the holes 18a and 18b in positions close to a yoke 1f or by pulling the objective lens holder 9 toward the yoke 1f by a rubber string or the like.

Figure 9:
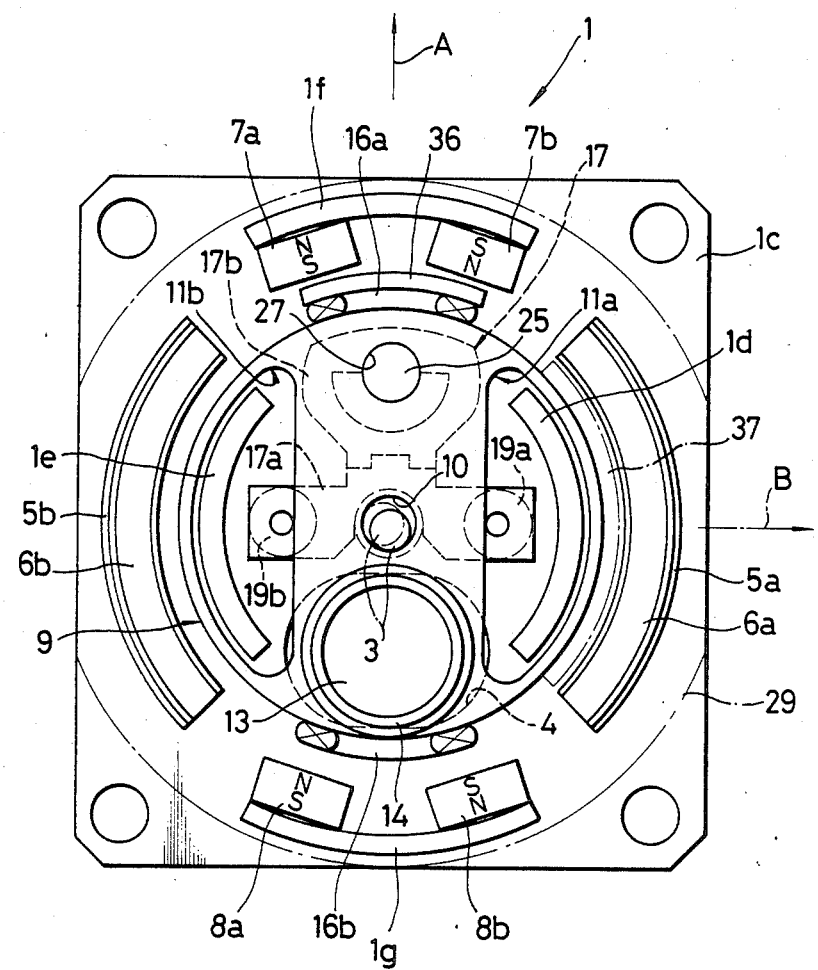
FIG. 9 is a plan view showing a modification of the present invention similar to FIG. 5.

As shown in FIG. 9, the inner circumferential surface of the bearing hole 10 can be magnetically pressed against the outer circumferential surface of the support shaft 3 along the direction indicated by arrow A by mounting a magnetic plate 36 overlapping a tracking coil 16a or the like so as to oppose magnets 7a and 7b and allowing the magnets 7a and 7b to attract the magnetic plate 36. The magnetic plate 36 can be a plate member of an amorphous magnetic material which can be formed into a thin plate, or a plate member of a non-magnetic material coated with a magnetic paint.

The pressing direction need not be the direction A and can be a direction opposite to the direction A or a tracking direction which is perpendicular to the arrow A. In order to achieve a direction indicated by arrow B and perpendicular to the arrow A as the tracking direction, as shown in FIG. 9, a magnetic plate 37 is mounted overlapping a focusing coil 15 or the like so as to oppose a magnet 5a and to allow the magnet 5a to attract the magnetic plate 37.

According to the present invention, even if there is a clearance between the objective lens holder 9 and the support shaft 3, shaking of the objective lens holder 9 due to the presence of this clearance is extremely small, so that an optical pickup with a good vibration resistance can be obtained.

What is claimed is:

1. An optical pickup comprising an objective lens holder, an objective lens received within said holder, a base, a support shaft secured to said base and supporting said objective lens holder such that said objective lens holder is slidable along an axial direction and pivotable about an axis thereof, a press member composed of an elastic material interposed between said objective lens holder and said base, said press member being compressed between said objective lens holder and said base such that said objective lens holder is urged in a direction perpendicular to said support shaft.

2. An optical pickup comprising an objective lens holder, an objective lens received within said holder, a base, a support shaft secured to said base and supporting said objective lens holder such that said objective lens holder is slidable along an axial direction and pivotable about an axis thereof, a press member comprising a magnetic member fixed to said objective lens holder and a magnet oriented to repel said magnetic member, said objective lens holder being biased in a direction perpendicular to said support shaft by the the force of said magnet.

3. An optical pickup according to claim 2, wherein said magnetic member comprises a plate member made of an amorphous magnetic material.

4. An optical pickup according to claim 2, wherein said magnetic member comprises a plate member which consists of a non-magnetic material and coated with a magnetic paint.

5. An optical pickup according to any one of claims 1 or 2, wherein the urging or biasing direction is a direction perpendicular to a tracking direction.

* * * * *